United States Patent
McLean et al.

(10) Patent No.: US 11,720,172 B2
(45) Date of Patent: Aug. 8, 2023

(54) INDICATION OF KEY INFORMATION APPRISAL

(71) Applicant: Lenovo (Singapore) Pte. Ltd., Singapore (SG)

(72) Inventors: James G McLean, Raleigh, NC (US); David D Chudy, Raleigh, NC (US); Kenneth J Born, Durham, NC (US); Cuong Thai, Raleigh, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 17/557,376

(22) Filed: Dec. 21, 2021

(65) Prior Publication Data

US 2023/0195218 A1 Jun. 22, 2023

(51) Int. Cl.
| | |
|---|---|
| G06F 3/0481 | (2022.01) |
| G06F 3/0485 | (2022.01) |
| G06F 3/01 | (2006.01) |
| H04L 67/55 | (2022.01) |

(52) U.S. Cl.
CPC ............ *G06F 3/013* (2013.01); *G06F 3/0481* (2013.01); *G06F 3/0485* (2013.01); *H04L 67/55* (2022.05)

(58) Field of Classification Search
None
See application file for complete search history.

(56) References Cited

U.S. PATENT DOCUMENTS

| | | | | |
|---|---|---|---|---|
| 8,761,737 | B2* | 6/2014 | Clarke | H04M 1/7243 709/227 |
| 9,285,875 | B2* | 3/2016 | Mihara | G06F 3/013 |
| 9,306,893 | B2* | 4/2016 | Sharp | H04L 51/42 |
| 9,311,718 | B2* | 4/2016 | Scavezze | G09G 5/10 |
| 9,354,701 | B2* | 5/2016 | Taguchi | G06F 3/013 |
| 9,377,853 | B2* | 6/2016 | Taguchi | G02B 27/0093 |
| 9,667,769 | B2* | 5/2017 | Clarke | H04M 1/7243 |
| 9,721,031 | B1* | 8/2017 | Marcum | G06F 16/9562 |
| 9,829,972 | B2* | 11/2017 | Conzola | G06V 40/19 |
| 9,923,943 | B2* | 3/2018 | Dickow | H04W 4/80 |
| 10,082,863 | B2* | 9/2018 | Kempinski | G06F 3/012 |
| 10,209,772 | B2* | 2/2019 | Dow | G06F 3/012 |
| 10,691,202 | B2* | 6/2020 | van Hoff | H04N 23/698 |
| 11,024,263 | B2* | 6/2021 | Chhipa | G06F 3/012 |
| 11,430,260 | B2* | 8/2022 | el Kaliouby | G06V 40/10 |
| 2010/0262922 | A1* | 10/2010 | Fan | G06Q 10/107 715/752 |

(Continued)

*Primary Examiner* — Jordany Nunez
(74) *Attorney, Agent, or Firm* — Ference & Associates LLC

(57) ABSTRACT

One embodiment provides a method, including: receiving, at an information handling device, an indication to open a text object; identifying, based upon analysis of context data associated with the text object, at least one article of key information contained within the text object; ascertaining, using a camera sensor, an aspect of user gaze within the text object; determining, based on the identified at least one article of key information and the ascertained aspect of user gaze, a degree to which a user is apprised of the at least one article of key information contained within the text object; and providing, based on the determining, a visual indication of the degree to which the user is apprised of the at least one article of key information. Other aspects are described and claimed.

20 Claims, 3 Drawing Sheets

(56) References Cited

U.S. PATENT DOCUMENTS

| | | | |
|---|---|---|---|
| 2012/0231770 A1* | 9/2012 | Clarke | G06F 3/048 455/414.1 |
| 2013/0300654 A1* | 11/2013 | Seki | G06F 3/013 345/156 |
| 2014/0289644 A1* | 9/2014 | Clarke | G06F 3/048 715/752 |
| 2015/0070268 A1* | 3/2015 | Taguchi | G06F 3/0481 345/156 |
| 2015/0077334 A1* | 3/2015 | Mihara | G06F 40/103 345/156 |
| 2015/0077335 A1* | 3/2015 | Taguchi | G06F 3/0485 345/156 |
| 2015/0128075 A1* | 5/2015 | Kempinski | G06F 3/012 715/765 |
| 2015/0188870 A1* | 7/2015 | Sharp | H04L 51/42 715/752 |
| 2015/0206321 A1* | 7/2015 | Scavezze | G06F 3/0485 345/633 |
| 2015/0227195 A1* | 8/2015 | McKenna | G06F 3/013 345/156 |
| 2015/0234460 A1* | 8/2015 | Irie | G06F 3/013 345/156 |
| 2015/0261292 A1* | 9/2015 | Conzola | G06F 3/013 345/156 |
| 2016/0094705 A1* | 3/2016 | Vendrow | G06V 40/19 382/103 |
| 2017/0061935 A1* | 3/2017 | Rummel | G06F 3/0481 |
| 2017/0085504 A1* | 3/2017 | Logan | H04N 1/32117 |
| 2017/0115841 A1* | 4/2017 | Dohadwala | G06F 3/04845 |
| 2017/0163588 A1* | 6/2017 | Devasthali | H04L 51/224 |
| 2019/0386947 A1* | 12/2019 | Pavitt | H04L 51/216 |
| 2020/0134295 A1* | 4/2020 | el Kaliouby | G06V 10/82 |
| 2021/0286427 A1* | 9/2021 | Pateriya | G06F 3/013 |
| 2021/0325960 A1* | 10/2021 | Iglesias | G06F 3/0484 |
| 2022/0236845 A1* | 7/2022 | Alam | G06F 3/0485 |

* cited by examiner

INDICATION OF KEY INFORMATION APPRISAL

BACKGROUND

Individuals utilize their information handling devices ("devices"), for example smart phones, tablets, wearable devices, laptops and/or personal computers, and the like, to access and interact with various types of content on their devices. For example, individuals may browse websites on the Internet, read and/or reply to communications (e.g., e-mails, text messages, other text notification, etc.), utilize various applications, and the like. During device use, individuals often encounter important information that they need to be apprised of.

BRIEF SUMMARY

In summary, one aspect provides a method, including: receiving, at an information handling device, an indication to open a text object; identifying, based upon analysis of context data associated with the text object, at least one article of key information contained within the text object; ascertaining, using a camera sensor, an aspect of user gaze within the text object; determining, based on the identified at least one article of key information and the ascertained aspect of user gaze, a degree to which a user is apprised of the at least one article of key information contained within the text object; and providing, based on the determining, a visual indication of the degree to which the user is apprised of the at least one article of key information.

Another aspect provides an information handling device, including: a camera sensor; a display screen; a processor; a memory device that stores instructions executable by the processor to: receive an indication to open a text object; identify, based upon analysis of context data associated with the text object, at least one article of key information contained within the text object; ascertain, using the camera sensor, an aspect of user gaze within the text object; determine, based on the identified at least one article of key information and the ascertained aspect of user gaze, a degree to which a user is apprised of the at least one article of key information contained within the text object; and provide, based on the determining, a visual indication of the degree to which the user is apprised of the at least one article of key information.

A further aspect provides a product, including: a storage device that stores code, the code being executable by a processor and comprising: code that receives an indication to open a text object; code that identifies, based upon analysis of context data associated with the text object, at least one article of key information contained within the text object; code that ascertains an aspect of user gaze within the text object; code that determines, based on the identified at least one article of key information and the ascertained aspect of user gaze, a degree to which a user is apprised of the at least one article of key information contained within the text object; and code that provides, based on the code that determines, a visual indication of the degree to which the user is apprised of the at least one article of key information.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
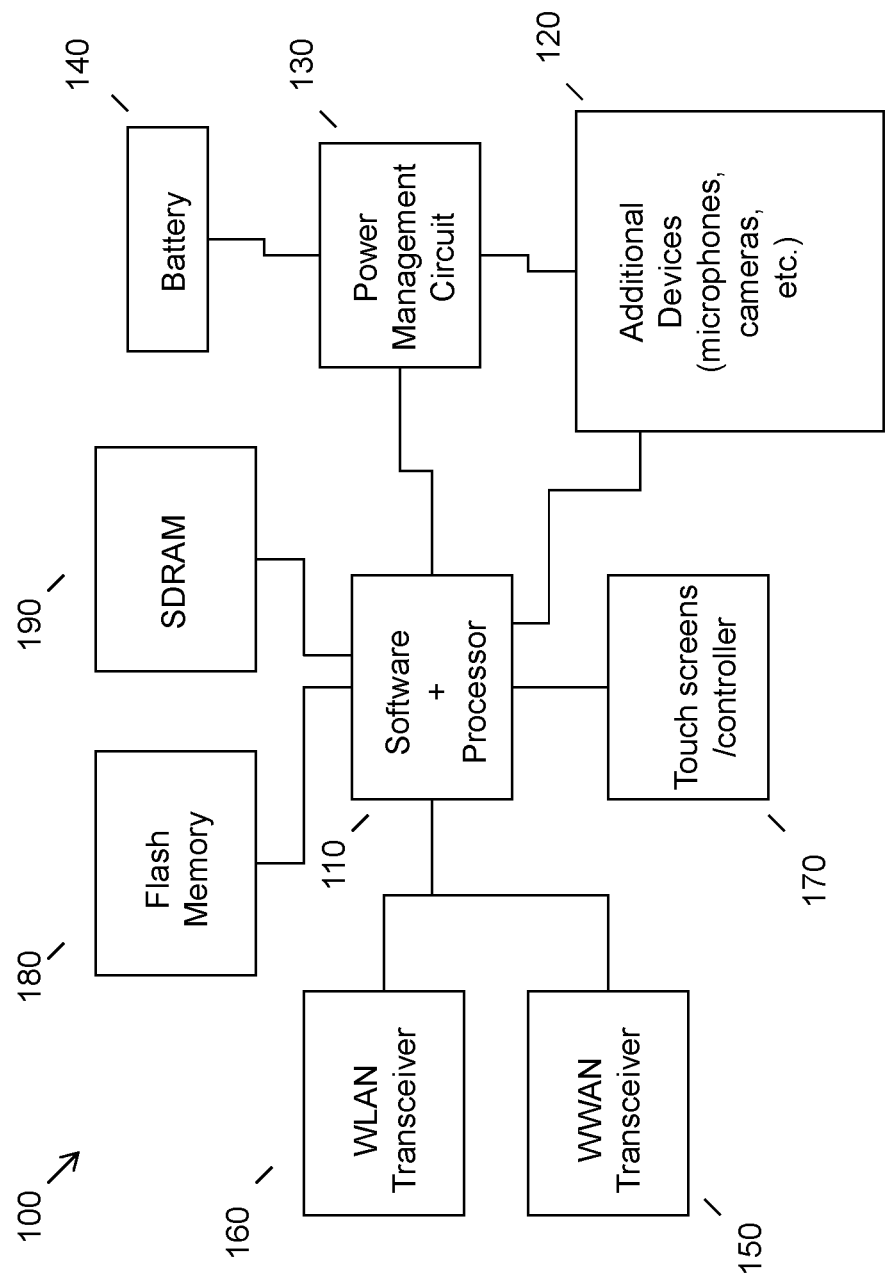
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Individuals receive large amounts of communicative material (e.g., e-mails, text messages, calendar notifications, social media messages, other text-based notifications, etc.) on a daily basis. It is not uncommon for individuals to glance through this material to manage the volume. However, important information is often missed when communications are quickly scanned rather than carefully read. This may lead to various consequences for the user.

Solutions exist that leverage machine learning techniques to identify and highlight key information in a document. These solutions may be helpful in emphasizing the important information in a text object to a user. However, some individuals find the highlighting intrusive and disruptive to their user experience. Additionally, there is currently no way to determine if the individual was actually apprised of the key information in the text object, regardless of whether it was visually emphasized or not.

Accordingly, an embodiment provides a method for providing a visual indication of a degree to which an individual is apprised of key information in a text object. In an embodiment, an indication to open a text object (e.g., a document, a communication, a website, another type of text-based object, etc.) may be received at a device. An embodiment may then analyze one or more types of context data associated with the text object (e.g., subject of text object, identity of user, job type of user, association between sender and user, any designation of key information by a sender or creator text object, etc.) to identify key information contained therein. An embodiment may further utilize one or more camera sensors to ascertain an aspect of user gaze (e.g., a focus of user gaze within the text object, a length of user gaze within the text object, a proportion of the text object viewed by the user, etc.). Thereafter, an embodiment may utilize the foregoing data metrics to determine a degree to which a user was apprised of the key information and may subsequently provide some type of visual indication of this determination. Such a method may provide more reliable indications of whether a user has grasped key information in a text object.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes an augmented reality device 170 for data input and display/rendering. System 100 also typically includes various memory devices, for example flash memory 180 and SDRAM 190.

Figure 2:
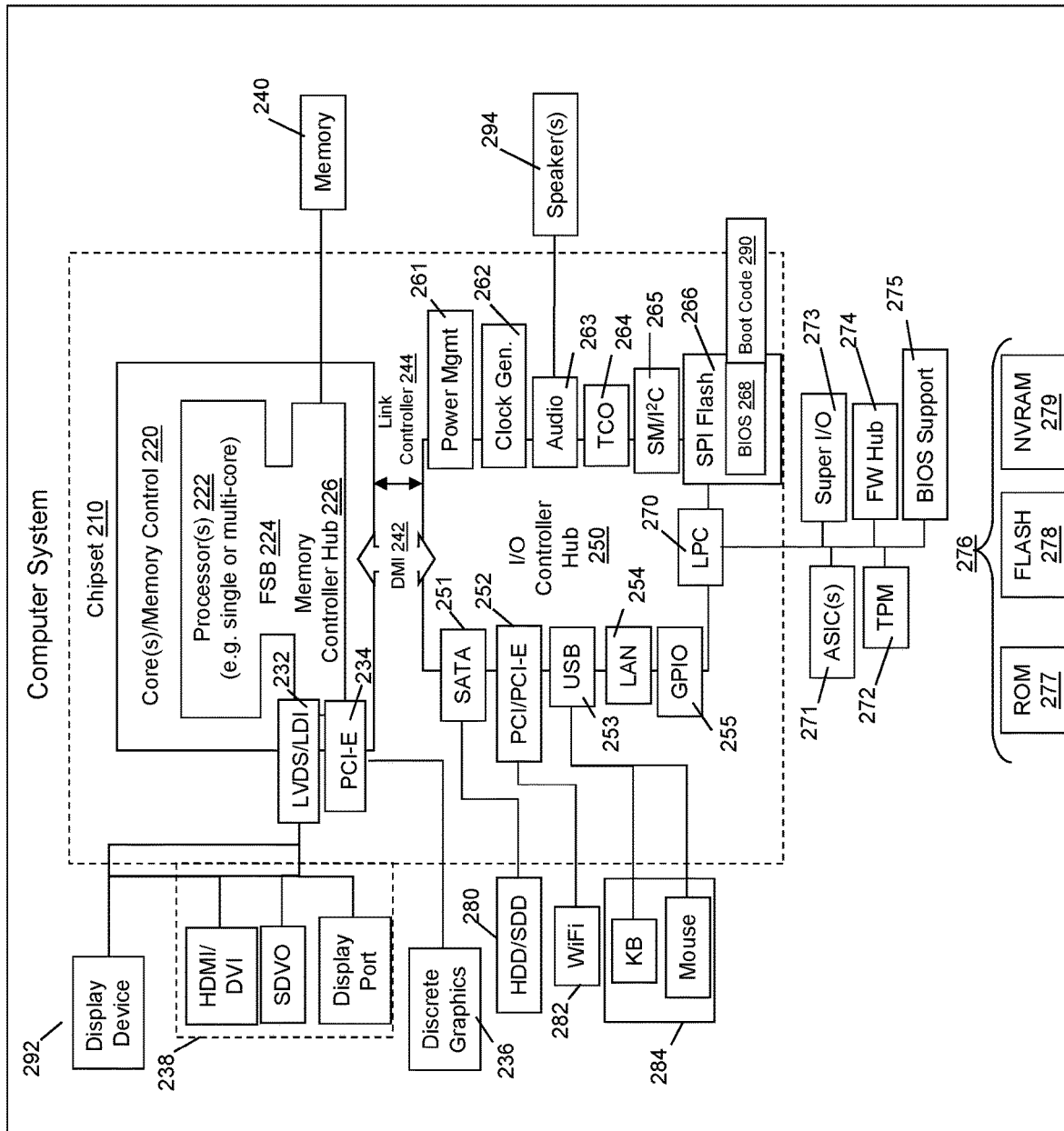
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of displaying text object and tracking a position of a user's gaze. For example, the circuitry outlined in FIG. 1 may be implemented in a smart phone, whereas the circuitry outlined in FIG. 2 may be implemented in a laptop or personal computer embodiment.

Figure 3:
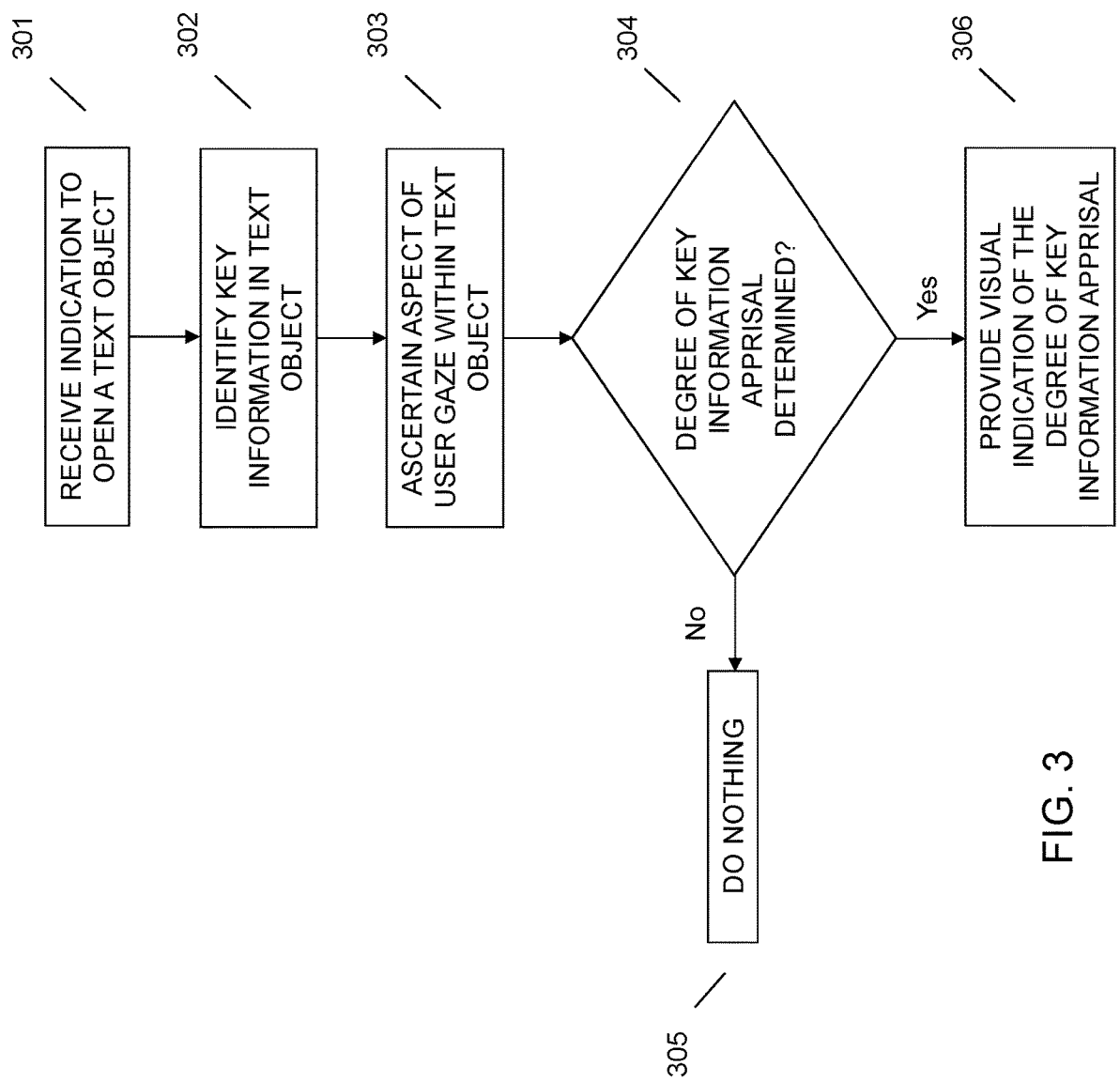
FIG. 3 illustrates an example method of dynamically providing an indication to a user regarding the degree to which they are apprised of important information in a text object.

Referring now to FIG. 3, an embodiment may provide an indication of the degree to which a user is apprised of key information in a text object. At 301, an embodiment may receive an indication to open a text object. In the context of this application, a text object may refer to any of: a communication (e.g., an email, a text message, a social media message, etc.), a document (e.g., a word-processing document, a publication, etc.), a text object on a website (e.g., a paragraph or passage on a website, etc.), or any other type of text-based notification (e.g., a calendar entry or notification, etc.). The indication to open the text object may be resultant from any conventional explicit user command to open/view the text object.

At 302, an embodiment may identify key pieces of information contained within the text object. The identification of this information may be facilitated automatically by analyzing available context data associated with the text object. The types of available context data may include one or more of: a subject of the text object (e.g., deduced dynamically from analysis of words in the text object or associated therewith, etc.), an identity of a user of the information handling device (e.g., determining via accessing user identity data associated with the device, etc.), a job type of the user, an association between a creator or sender of the text object and the user (e.g., the professional dynamic between the two individuals in a company, the dynamic between the two individuals in a social relationship, etc.), a designation of the key information by the creator or sender of the text object (e.g., an identification of any information that the creator explicitly marked as important, etc.), and combinations thereof.

As a non-limiting example of the foregoing, an embodiment may identify that a text object is a meeting request and may correspondingly identify (e.g., via utilizing one or more conventional text analysis techniques, etc.) aspects within the text object that are conventionally important to a meeting request (e.g., meeting time, meeting place, projected participants, topics covered, etc.). As another non-limiting example, responsive to identifying that a text object is a message sent from a user's boss, an embodiment may classify the entire message as important given the nature of the professional relationship. In yet another non-limiting example, having knowledge of a user's job an embodiment may identify that a task request within a text object may be important for the user to be aware of At 303, an embodiment may ascertain an aspect of user gaze within the text object. In the context of this application, the aspect of user gaze may correspond to one or more of: a focus of a user's gaze within the text object (e.g., the words, sentences, or paragraphs a user is determined to have looked at, etc.), a length of the user's gaze on the focus points (e.g., how long was a user's focus fixed on a particular portion of the text object, etc.), a percentage or proportion of the text object viewed by the user (e.g., what percentage of the text object was scanned by a user's gaze, etc.), and the like.

In an embodiment, the aspect of user gaze may be ascertained via the utilization of one or more available camera sensors. More particularly, an embodiment may capture image data of the user using one or more integrally or operatively coupled user-facing camera sensors. The camera sensor(s) may be always-on or may activate in response to a predetermined event (e.g., upon detection of the user in front of the screen, in response to a user command to activate, upon activation of an application containing a text object, upon identifying that a text-object is actively displayed, etc.). One or more conventional gaze tracking techniques may then utilize this captured image data to ascertain a direction and/or focus of a user's gaze on the display screen.

At 304, an embodiment may determine a degree to which a user is apprised of, or comprehends, the key information contained within the text object. More particularly, the degree of a user's comprehension of the key information may be deduced by analyzing the relationship between the ascertained aspects of the user's gaze with the key information. In this regard, the determination may be facilitated by consulting a ruleset (e.g., stored locally on the device, stored remotely on another device or server, etc.) that may identify the criteria necessary for key information to be considered "fully read", "partially read", "scanned", or "unread" by the user. In an embodiment, the ruleset may be originally created by a manufacturer of the device and/or may later be adjusted by a user (e.g., by navigating a settings menu, etc.). More particularly, the various criteria necessary for each comprehension designation may be adjustable by a user.

As a non-limiting example of the foregoing concepts, the ruleset may specify that a user has partially read key information when it is determined that a focus of their gaze has simply fallen on the key information in the text object a single time. In another non-limiting example, the ruleset may specify that a user has fully read key information when it is determined that a focus of their gaze has fallen on key information for at least a predetermined period of time (e.g., 5 seconds, 10 seconds, 30 seconds, etc.). This predetermined time period may be dynamically adjusted based at least upon a length of the key information. For instance, key information that is textually long (e.g., a multitude of sentences or paragraphs, etc.) may have a longer threshold period of comprehension than key information that is short (e.g., a few words or sentences, etc.). In yet another non-limiting example, the ruleset may specify whether key information is "read", "partially read", or "unread" based upon a proportion of the text object that the user's gaze has fallen on. More particularly, an embodiment may have various thresholds for each comprehension conclusion (e.g., an embodiment may conclude: that the key information is unread if the user gaze has fallen on less than 33% of the text object, partially read if the user gaze has fallen on at least 33% of the text object but less than 75% of the text object, and fully read when the user gaze has fallen on over 75% of the text object, etc.).

In situations where there are at least two separate articles of key information, it is possible for an embodiment to assign different comprehension designations for each article. More particularly, an embodiment may identify that some pieces of key information were fully ascertained whereas others were only partially ascertained, briefly scanned, or completely unread. The assignment of the comprehension designation for each key information article may be facilitated in the same way as described above.

To further determine a degree to which a user is apprised of, or comprehends, the key information contained within the text object, the system may apply one or more of the above identified information (e.g., how long the user focuses on the content, which parts of the item are viewed, the overall percentage of the item that is viewed, etc.) to a machine-learning model or artificial intelligence engine. The artificial intelligence engine determines a level of engagement and may also determine a characterization of that engagement in relation to the key information contained in the document. The artificial intelligence engine can also use the previously identified context data to further refine its determination. Thus, the artificial intelligence engine can be utilized to further refine the determination of whether the user was apprised or, or comprehended, the key information within the text object. Accordingly, the artificial intelligence engine can be used to assist in determining if the text object should be labeled as "unread," "viewed briefly," "scanned," "fully read," "studied," and the like.

It should also be noted that the artificial intelligence engine can use previously classified information to further refine or trains itself to make more accurate predictions or classification. The previously classified information may be generated by the engine itself and then it may take that information and ingest it to further refine the artificial intelligence engine. In other words, in addition to providing a classification to a user or other system, the artificial intelligence engine may provide the classification to itself so that it can further refine its algorithm and become more accurate in its predictions.

Responsive to determining, at 304, that no key information exists in the text object and/or that the user's comprehension of the key information is not able to be determined, an embodiment may, at 305, take no additional action. Conversely, responsive to determining, at 304, a degree to which a user is ascertained of the key information, an embodiment may provide, at 306, an indication of the degree to which the user is apprised of the key information. In an embodiment, the provision of this indication may occur automatically (i.e., without the receipt of any additional user input).

In an embodiment, the indication may be provided to the user of the device and/or to the creator of the text object. Additionally or alternatively to the foregoing, an indication of the degree of comprehension may be saved to the text object as metadata for future reference. As an example of the foregoing concepts, a sender of an email may receive an indication that an email recipient has been apprised of the key information contained therein. As another example, a teacher may be informed of the degree to which their student has looked at key information in a reading assignment. In yet another example, in the legal context, assurances may be provided to all parties that key information has been fully viewed by the relevant individuals before a document (e.g., a contract such as a license agreement, etc.) is signed.

In an embodiment, the indication may be a visual indication (e.g., provided on a display screen of the device, etc.), an audible indication (e.g., provided through one or more available speakers integrally or operatively coupled to the device, etc.), or a combination thereof. With respect to the former, the visual notification may be provided in one or more different ways. For example, an embodiment may provide a push notification on the display that may provide an indication of the number of articles of key information, where in the text object they are located, the nature of the key information in the text object, and/or the degree to which the user was apprised of each article of key information. In another example of visual indication provision, an embodiment may visually distinguish the key information from the remaining text object. For example, an embodiment may dynamically highlight the key information in the text object and may utilize different colors to distinguish between the comprehension designations (e.g., key information highlighted in green indicates that the user was fully apprised of the information, key information highlighted in yellow indicates that the user was partially apprised of the information, key information highlighted in red indicates that the user was not apprised of the information, etc.). In yet another example of visual indication provision, an embodiment may represent the proportion of key information that a user has been apprised of in some type of graphical format (e.g., a progress bar, a Harvey ball indicator, a color-coded chart, etc.).

The visual indications may contain various characteristics to further ensure that the user is apprised of the key information or to ensure that the user understands that they have missed key information and/or to identify which articles of key information the user has missed. For example, an embodiment may prevent a user from closing the push notification until a determination is made that most or all of the key information has been fully read. Additionally or alternatively, an embodiment may prevent a user from continuing further in a document, application, website, or other activity until it is determined that all of the key information in the instant text object has been fully read. Additionally or alternatively, an embodiment may allow a user to close a push notification or to proceed further with an activity when all the key information has not been fully read responsive to detecting an acknowledgement input provided by the user.

The various embodiments described herein thus represent a technical improvement to conventional methods for ensuring that a user is apprised of important information within a text object. Using the techniques described herein, an embodiment may receive an indication to open a text object. An embodiment may then identify one or more articles of key information within that text object and utilize one or more camera sensors to ascertain aspects of user gaze within the text object. Thereafter, an embodiment may utilize these data metrics to determine a degree to which a user was apprised of the key information and may then subsequently provide an indication of this degree to the user and/or to one or more other individuals. Such a method may minimize instances where a user misses key information.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, an indication to open a text object;
   identifying, based upon analysis of context data associated with the text object, at least one article of key information contained within the text object;
   ascertaining, using a camera sensor, an aspect of user gaze within the text object;
   determining, based on the identified at least one article of key information and the ascertained aspect of user gaze, a degree to which a user is apprised of the at least one article of key information contained within the text object, wherein the determining comprises identifying that the aspect of the user's gaze has fallen on the at least one article of key information for a predetermined period of time that is dynamically adjusted based at least upon a length of the at least one article of key information; and
   providing, based on the determining, a visual indication of the degree to which the user is apprised of the at least one article of key information, wherein the providing comprises at least one of: preventing a user from continuing in the text object upon determining the at least one article of key information has not been read and detecting an acknowledgment input that the key information has not been fully read.

2. The method of claim 1, wherein the context data is at least one data metric selected from the group consisting of: a subject of the text object, an identity of a user of the information handling device, a job type of the user, an association between a creator of the text object and the user, a designation of the key information by the creator, and combinations thereof.

3. The method of claim 1, wherein the aspect is at least one comprehension aspect selected from the group consisting of: a focus of the user gaze within the text object, a length of the user gaze within the text object, a percentage of the text objected viewed by the user gaze, and combinations thereof.

4. The method of claim 1, wherein the determining comprises determining that the degree to which the user is apprised of the at least one article of key information is an unapprised degree and wherein the providing the visual indication comprises visually distinguishing the at least one article of key information from other articles of information in the text object.

5. The method of claim 1, wherein the providing the visual indication comprises representing the degree to which the user is apprised of the at least one article of key information in a graphical format.

6. The method of claim 1, wherein the providing the visual indication comprises providing a push notification on a display screen of the information handling device.

7. The method of claim 6, further comprising maintaining the push notification on the display screen until the degree to which the user is apprised of the key information corresponds to a fully apprised degree.

8. The method of claim 1, further comprising preventing additional user action within an application until the degree to which the user is apprised of the key information corresponds to a fully read degree.

9. The method of claim 1, further comprising saving, as metadata attached to the text object, the degree to which the user is apprised of the key information.

10. The method of claim 1, wherein the text object is a communication received from a sender and further comprising transmitting, to the sender, an indication of the degree to which the user is apprised of the at least one article of key information.

11. An information handling device, comprising:
   a camera sensor;
   a display screen;
   a processor;
   a memory device that stores instructions executable by the processor to:
   receive an indication to open a text object;
   identify, based upon analysis of context data associated with the text object, at least one article of key information contained within the text object;
   ascertain, using the camera sensor, an aspect of user gaze within the text object;
   determine, based on the identified at least one article of key information and the ascertained aspect of user gaze, a degree to which a user is apprised of the at least one article of key information contained within the text object, wherein to determine comprises identifying that the aspect of the user's gaze has fallen on the at least one article of key information for a predetermined period of time that is dynamically adjusted based at least upon a length of the at least one article of key information; and provide, based on the determining, a visual indication of the degree to which the user is apprised of the at least one article of key information, wherein to provide comprises at least one of: preventing a user from continuing in the text object upon determining the at least one article of key information has not been read and detecting an acknowledgment input that the key information has not been fully read.

12. The information handling device of claim 11, wherein the context data is at least one data metric selected from the group consisting of: a subject of the text object, an identity of a user of the information handling device, a job type of the user, an association between a creator of the text object and the user, a designation of the key information by the creator, and combinations thereof.

13. The information handling device of claim 11, wherein the aspect is at least one comprehension aspect selected from the group consisting of: a focus of the user gaze within the text object, a length of the user gaze within the text object, a percentage of the text objected viewed by the user gaze, and combinations thereof.

14. The information handling device of claim 11, wherein the instructions executable by the processor to determine comprise instructions executable by the processor to determine that the degree to which the user is apprised of the at least one article of key information is an unapprised degree and wherein the instructions executable by the processor to provide the visual indication comprise instructions executable by the processor to visually distinguish the at least one article of key information from other articles of information in the text object.

15. The information handling device of claim 11, wherein the instructions executable by the processor to provide the visual indication comprise instructions executable by the processor to represent the degree to which the user is apprised of the at least one article of key information in a graphical format.

16. The information handling device of claim 11, wherein the instructions executable by the processor to provide the visual indication comprise instructions executable by the processor to provide a push notification on the display screen of the information handling device.

17. The information handling device of claim 16, wherein the instructions are further executable by the processor to maintain the push notification on the display screen until the degree to which the user is apprised of the key information corresponds to a fully apprised degree.

18. The information handling device of claim 11, wherein the instructions are further executable by the processor to prevent additional user action within an application until the degree to which the user is apprised of the key information corresponds to a fully read degree.

19. The information handling device of claim 11, wherein the text object is a communication received from a sender and wherein the instructions are further executable by the processor to transmit, to the sender, an indication of the degree to which the user is apprised of the at least one article of key information.

20. A product, comprising:
a storage device that stores code, the code being executable by a processor and comprising:
code that receives an indication to open a text object;
code that identifies, based upon analysis of context data associated with the text object, at least one article of key information contained within the text object;
code that ascertains an aspect of user gaze within the text object;
code that determines, based on the identified at least one article of key information and the ascertained aspect of user gaze, a degree to which a user is apprised of the at least one article of key information contained within the text object, wherein the code that determines comprises code that identifies that the aspect of the user's gaze has fallen on the at least one article of key information for a predetermined period of time that is dynamically adjusted based at least upon a length of the at least one article of key information; and
code that provides, based on the code that determines, a visual indication of the degree to which the user is apprised of the at least one article of key information, wherein the code that provides comprises at least one of: preventing a user from continuing in the text object upon determining the at least one article of key information has not been read and detecting an acknowledgment input that the key information has not been fully read.

* * * * *